(12) United States Patent
Peden

(10) Patent No.: US 7,987,207 B2
(45) Date of Patent: Jul. 26, 2011

(54) SYSTEM AND METHOD FOR TENANT SCREENING

(76) Inventor: John Peden, Payson, UT (US)

( * ) Notice: Subject to any disclaimer, the term of this patent is extended or adjusted under 35 U.S.C. 154(b) by 497 days.

(21) Appl. No.: 12/105,680

(22) Filed: Apr. 18, 2008

(65) Prior Publication Data

US 2008/0263058 A1 Oct. 23, 2008

Related U.S. Application Data

(60) Provisional application No. 60/925,525, filed on Apr. 20, 2007.

(51) Int. Cl.
*G06F 17/30* (2006.01)
(52) U.S. Cl. ...................................................... 707/802
(58) Field of Classification Search .................. 707/609, 707/705, 802; 705/37, 38, 307, 314
See application file for complete search history.

(56) References Cited

U.S. PATENT DOCUMENTS
2003/0208362 A1 * 11/2003 Enthoven et al. ................. 705/1
* cited by examiner

*Primary Examiner* — Fred I Ehichioya
(74) *Attorney, Agent, or Firm* — Holland & Hart LLP

(57) ABSTRACT

A system and method for collecting and dispersing information for the purpose of tenant screening includes, according to one exemplary embodiment, a database configured to both receive information regarding tenants and also provide information to landlords about potential tenants. Landlords registered with a consumer information bureau for the purpose of tenant screening as both a participant and client, have access to the database. Registered landlords provide tenant information regarding current and previous tenants, and are also able to view the tenant information associated with potential tenants. The tenant information provides the landlord with detailed information supplied by previous landlords of the potential tenant.

16 Claims, 3 Drawing Sheets

SYSTEM AND METHOD FOR TENANT SCREENING

RELATED APPLICATIONS

The present application claims the benefit under 35 U.S.C. §119(e) of U.S. Provisional Patent Application No. 60/925,525 filed Apr. 20, 2007 titled "Apparatus, system, and method for consumer information bureau for the purpose of tenant screening" which application is incorporated herein by reference in their entireties.

FIELD

The present exemplary system and method relate to consumer information bureaus. More particularly, the present system relates to a consumer information bureau for the purpose of tenant screening.

BACKGROUND

The process of leasing an apartment to a tenant can be a complicated and risky process for the landlord. A landlord who chooses to lease real estate to a tenant runs several risks, including risks associated with the tenant not paying, damaging the property, stealing from the property, and/or disturbing other nearby tenants who lease from the same landlord, all of which may be detrimental to the landlord. These risks are inherent to leasing and renting and landlords are typically aware of these risks. Consequently, several methods and services are utilized by landlords to minimize possible risks by screening tenants.

Tenant screening is common service utilized by landlords for property leasing. Often a landlord will require personal information from a potential tenant and with the information the landlord may, personally or through a screening service, perform a background check on the tenant, obtain credit history, bankruptcy history, and/or obtain some limited information in regard to court orders. The screening process, although helpful, does not always provide sufficient information to the landlord to confidently enter contractual agreements with tenants who will uphold their end of the agreement.

Screening services by third parties are often more complete and provide a better idea to the landlord of the risks associated with a potential tenant. Often a third party screening service is able to provide the landlord, for a fee, information showing statewide eviction history, nationwide criminal history, and/or nationwide credit reports. These third party screening services provide a much more complete report on the risks associated with a potential tenant; however, they do not provide a comprehensive history of the tenant and therefore may fail to provide some useful information related to the potential tenant. For example, current tenant screening processes may not provide a landlord with information regarding the damage the tenant had done to a previously leased property, whether the tenant pays on time, whether the tenant is respectful to others or is a disturbance, and other information that may be pertinent to the landlord's decision.

As currently available, landlords are unable to acquire the desired information to confidently lease property to a potential tenant without significant risk. Current systems and methods fail to provide a comprehensive tenant history allowing the landlord to make a decision fully aware of the history of the tenant.

SUMMARY

A system and method for collecting and dispersing information for tenant screening includes, according to one exemplary embodiment, a database configured to both receive information regarding tenants and also provide information to landlords about potential tenants. According to this embodiment, landlords register with a consumer information bureau for the purpose of tenant screening as both a participant and client have access to the database. Registered landlords provide tenant information regarding current and previous tenants and are also able to view the tenant information associated with potential tenants. The tenant information provides the landlord with detailed information supplied by previous landlords of the potential tenant.

According to one exemplary embodiment, a landlord has access to the present exemplary consumer information bureau for tenant screening. The consumer information bureau for tenant screening includes a database wherein a plurality of landlords contribute information regarding their current and previous tenants, herein referred to as tenant information. According to one exemplary embodiment, registered landlords regularly update tenant information regarding each of the tenants leasing from them. Landlords are then given access to the collective tenant information for the purpose of tenant screening. Consequently, the information within the database is sufficient to provide a comprehensive tenant report allowing a landlord to accurately assess the risk associated with a given tenant.

According to one exemplary embodiment, landlords elect to participate and subsequently electronically transmit to and receive tenant information from a server, where the server may be a central server accessed by all affiliated parties or the server may be one of a plurality of interconnected servers. According to yet another embodiment, the participating landlords may transmit and receive tenant information through traditional printed correspondence in addition or as a supplement to the electronic transmissions.

DETAILED DESCRIPTION

Figure 1:
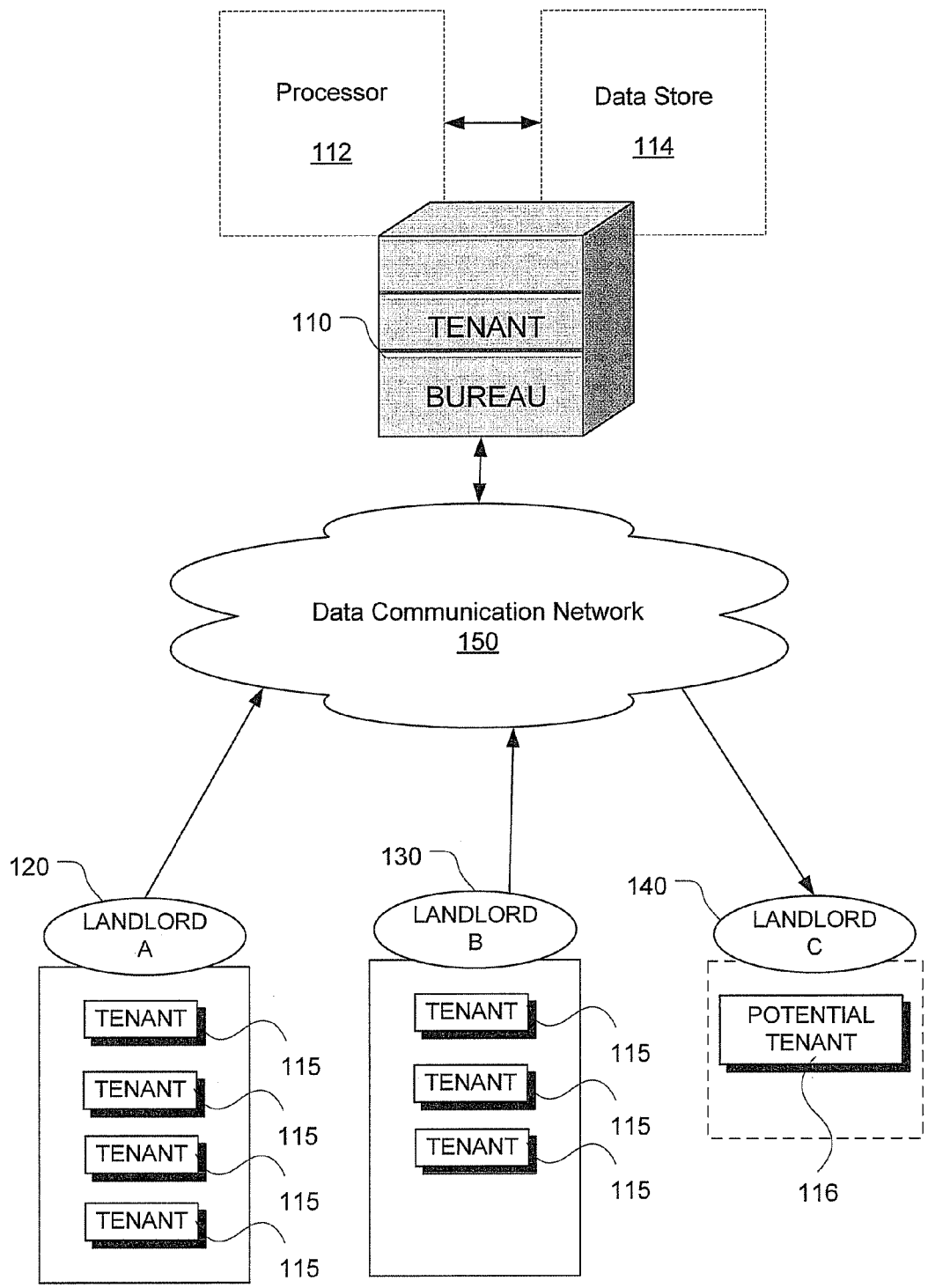
FIG. 1 is a block diagram illustrating the transfer of information between landlords and a consumer information bureau for the purpose of tenant screening, according to one exemplary embodiment.

An exemplary system and method of a consumer information bureau for the purpose of tenant screening is detailed herein. According to one exemplary embodiment, the consumer information bureau, hereafter referred to as "tenant bureau", includes a database containing tenant information. The tenant information is provided by landlords and is also available to landlords for the purpose of tenant screening.

As used herein, the term "consumer information bureau" is any amalgamation of data on consumers. Traditional consumer information bureaus include credit bureaus, mailing lists, magazine subscription lists, customer satisfaction surveys, political party registers, sweepstakes entries, and so on. Each has a main purpose and, usually, several ancillary purposes. For instance, the credit bureau's main purpose is to store information related to creditworthiness. Ancillary uses of a credit bureau include, but are not limited to, skiptracing by collection agencies, lifestyle risk by insurance companies, a place for courts to report on judgments, or sales of mailing lists to marketing companies.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

According to one embodiment, a database of tenant information, generated by members of the tenant bureau, is accessible to registered members of the tenant bureau. According to one exemplary embodiment, registered members of the tenant bureau include, but are in no way limited to, landlords and agents acting in their behalf. The database, according to one exemplary embodiment, is an electronic database and is connected to a server or is connected to one of a plurality of interconnected servers, wherein the server enables landlords and other authorized individuals limited access to stored information. As used herein, and in the appended claims, the term "server" shall be interpreted broadly as including any computing device including a data storage module and a processor, wherein the processor is configured to access the data storage module and retrieve executable instructions for sharing data over a network. Additionally, a server may act as a communications gateway between a plurality of computers connected thereto, responding to requests for information from client computers. Furthermore, the server enables landlords and other authorized individuals to import information into the database or data storage module, including tenant information regarding their current and previous tenants.

Alternatively, the database may not comprise an electronic database, but rather interactions between a landlord and the database may be done through conventional paper communication. It is also conceivable that an electronic database, as part of the tenant bureau, may be supplemented by conventional paper document. That is, landlords entering tenant information regarding a tenant in an electronic format may also provide physical documentation to the tenant bureau. Furthermore, a tenant bureau may be configured to allow some landlords to participate electronically and others to communicate through physical documents, such as paper documents. According to alternative embodiments, the communication between the tenant bureau and clients can be any of a direct-dial computer system, a website on the Internet (whether secured or unsecured), peer-to-peer networks, a direct-connection, a wireless connection, physical mail, or any combination thereof.

FIG. 1 illustrates an embodiment of a tenant bureau, according to one exemplary embodiment. As shown in FIG. 1, a tenant bureau (110) is shown being communicatively connected to three landlords (120, 130, 140) through a data communication network (150). The present exemplary system and method is illustrated in FIG. 1 as including three landlords for illustrative simplicity only; it is intended that the database of the tenant bureau (110) be accessible to any number of registered clients. As used herein, the term "client" shall be interpreted broadly as including any person with access to view and/or submit at least a portion of the tenant information contained within the database of the tenant bureau (110) including, but in no way limited to, landlords, agents, real estate advisors, tenants, tax preparers, and landlord representatives. Returning to FIG. 1, a database, which may be an electronic database, a physical database, or a combination of the two, is accessible to three landlords, Landlord A (120), Landlord B (130), and Landlord C (140). Landlord A (120) and Landlord B (130) are shown as having four and three tenants (115) respectively. According to one exemplary embodiment, both Landlord A (120) and Landlord B (130) submit tenant information on a regular basis. That is, each of the two landlords with tenants (115), submit tenant information to the tenant bureau (110). As shown in FIG. 1, the third landlord, Landlord C (140), has a potential tenant (116). As previously mentioned, Landlord C (140), in an attempt to minimize the risk associated with leasing, may desire to evaluate the tenant information of the potential tenant (116). Landlord C (140) may submit personal information gathered from the potential tenant (116) to the tenant bureau (110) and retrieve the tenant information associated with potential tenant (116). Personal information being any information sufficient to identify the potential tenant (116) within the tenant bureau database.

The interaction between landlords (120, 130, 140) and the tenant bureau (110), according to one exemplary embodiment, is shown in the diagram of FIG. 1. The illustrated embodiment has two landlords (120, 130) submitting tenant information to the tenant bureau (110) and one landlord (140) receiving tenant information from the tenant bureau (110) via a data communication network (150). The illustration is overly simplified, for ease of explanation. According to one exemplary embodiment, the tenant bureau (110) receives tenant information from a plurality of landlords leasing to tenants (115), and provides tenant information to a plurality of landlords requesting tenant information. Many of the landlords may provide tenant information regarding their current tenants (115) and also receive tenant information regarding their potential tenants (116); consequently, many landlords may submit and retrieve tenant information from the tenant bureau (110) on a regular basis.

Tenant information as described above and in the subsequent description and claims may include, but is not limited to, payment history, complaints about and/or from the tenant (115), deposits paid by the tenant, deposits returned to the tenant, damage done to the rental unit by the tenant, eviction started, eviction completed, abandonment of the lease or property, smoking status of the unit, smoking status of the tenant, whether pets are allowed, whether pets were occupying the unit, and/or length of time of the tenant occupying the unit. It is also conceivable that the tenant information may include various other informational items that a landlord deems may be of use to future landlords, this could be provided in the form of a comments box.

The tenant bureau (110), according to one exemplary embodiment, may utilize the tenant information gathered from one or more landlords (120, 130) to develop a concise risk assessment. For example, through analysis of the tenant information provided by several landlords of a given tenant (115), the tenant bureau may formulate a tenant score, where the score ranges from a low number to a high number. The landlord (140) may then be provided access to the tenant score and be able to easily identify the risk associated with a given potential tenant (116), a low score being more risk than a high score, or vice-versa. Alternatively, rather than a risk assessment in the form of a numerical score, an adjective describing the risk associated with the tenant may be formulated by the analysis, for instance, low, medium-low, medium, medium-high, and high. The previous examples of a method of concisely reporting an analysis of a tenant's tenant information are merely exemplary of many possible choices, including, but not limited to, a graph, a meter, color coordinated rankings, alphanumeric rankings, and many other methods commonly used to compare the status of an object to that of minimum and maximum states.

The tenant bureau (110), according to one exemplary embodiment, transmits and receives tenant information to and from clients (120, 130, 140). The information, as previously discussed, is stored in a database; a database, according to several embodiments, includes a physical collection of documents and information, and/or an electronic collection of documents and information. As illustrated in FIG. 1, the database is in the form of an electronic data storage device (114) communicatively connected to a processor (112) and associated with the tenant bureau (110).

Accordingly, those skilled in the art will recognize that the processes described herein may be implemented at least in part as instructions executable by one or more computing devices. In general, a processor (112) (e.g., a microprocessor) receives instructions, e.g., from a memory (114), a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The data store (114) implemented by the present exemplary tenant bureau (110) may include one or more data storage mediums, devices, or configurations and may employ any type, form, and combination of storage media known to those skilled in the art, as mentioned above. The data store (114) may include any known technologies useful for storing, updating, modifying, accessing, retrieving, and deleting data.

The data store (114) may include any suitable type or form of electronic data representative of or associated with tenant identifiers, tenant information, tenant ratings, landlord information, landlord ratings, landlord histories, any other information that providing consumer information for tenant screening. The data may be stored in extensible markup language ("XML"), or in any suitable form.

While FIG. 1 illustrates the data store (114) as being included in the tenant bureau (110), this is not limiting. For example, the tenant bureau (110) may be configured to store and/or retrieve data to/from external data sources. Any data potentially helpful for collecting tenant information and assigning tenant risk levels based on the tenant information may be retrieved from any suitable and accessible internal or external data source.

According to one exemplary embodiment, the data store (114) includes instructions executable by a processor (112) to send, receive, and display information related to tenants and landlords for the purpose of tenant screening.

Access to the database, according to one embodiment including an electronic database, may be through a data communication network (150). The data communication network (150) may include one or more networks suitable for carrying communications between clients, such as landlords (120, 130, 140) and the tenant bureau (110). For example, the data communication network (150) may include, but is not limited to, the Internet, World Wide Web and/or one or more intranets, local area networks, wide area networks, voice communication networks (e.g., the Public Switched Telephone Network ("PSTN"), Voice over Internet Protocol ("VoIP"), and wireless telephone networks), video and/or audio broadcasting networks (e.g., satellite and cable television networks), access networks, packet-switched networks, circuit-switched networks, and any other communications networks capable of carrying communications between client devices and the tenant bureau (110). The data communication network (150) may include any devices, media, and technologies helpful for carrying communications between client devices and the tenant bureau (110). According to one exemplary embodiment, clients are able to access the data store (114) of the tenant bureau (110) in the form of a website, wherein clients are able to login and thereby create tenant profiles, update tenant information, and view tenant information. According to one exemplary embodiment, clients are able to communicate to other clients and the tenant bureau administration via the data communication network and through the tenant bureau website.

The tenant bureau (110), according to one exemplary embodiment, includes instructions in the data store (114) that when accessed and executed by the processor (112) generates a user interface at the client device that allows the client to access an input webpage for entering tenant information and a query webpage where clients may enter the personal information of a potential tenant and retrieve the tenant information pertaining to that potential tenant. The webpage can be an interface whereby clients interact with a single server or a plurality of servers, where the information collected by and transmitted to clients is stored on storage devices communicatively attached to the server or servers. An embodiment involving multiple servers and/or multiple storage devices would preferably incorporate a method of unifying all of the collected tenant information, this might be done through a central server or central database accessible to all other servers, or through each server having access to and being communicatively connected to the other servers. According to one exemplary embodiment, the present server may include, but is in no way limited to any application, operating system, computer, or appliance, or virtual server that performs services for connected clients as part of a client-server architecture wherein it accepts connections in order to service requests by sending back responses. Furthermore, the server may include any number of data storage devices or memory devices associated therewith.

Figure 2:
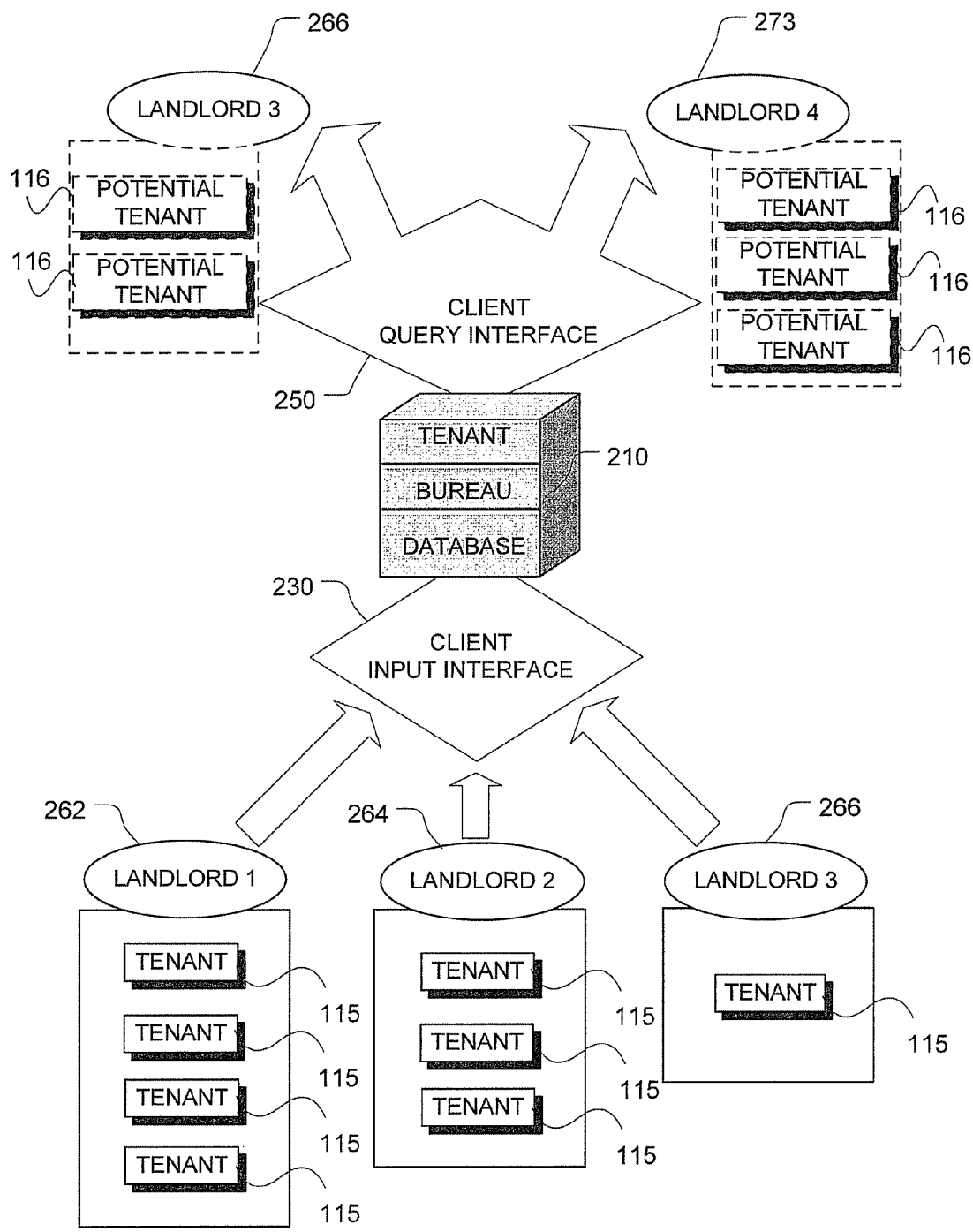
FIG. 2 is a block diagram illustrating landlords interacting with a tenant information database, according to one exemplary embodiment.

As shown in FIG. 2, according to one exemplary embodiment, the tenant bureau database (210) comprises an input interface (230) and a query interface (250). The input interface (230) allows clients (262, 264, 266), illustrated as landlords in the drawing, to supply the tenant bureau database (210) with tenant information regarding a given clients current and previous tenants (115). The query interface (250) allows clients (266, 273), also illustrated as landlords in the drawing, to retrieve tenant information regarding potential tenants (116) by submitting information identifying the potential tenant. Both the query (250) and the input interface (230) represent any interface adequate for supporting the communication between the tenant bureau database (210) and the clients subscribing to it. The interfaces, according to one embodiment, utilize a client-server relationship through a web interface. In another exemplary embodiment, the interfaces for input (250) and query (230) represent an interface adequate for transmitting physical documents, such as mail.

As illustrated in FIG. 2, according to one exemplary embodiment, a tenant bureau database (210) is shown communicatively connected to three landlords (262, 264, 266) with current tenants (115) through the client input interface (230) and two landlords (266, 273) with potential tenants (116) through the client query interface (250). It is also possible, as exemplified in FIG. 2 by Landlord 3 (266), that a client both submits tenant information to the tenant bureau database in regards to current tenants (115), and requests tenant information pertaining to potential tenants (116).

A client submitting information to the tenant bureau requesting tenant information in regards to a potential tenant (116) may, according to one exemplary embodiment, be supplied information in addition to the tenant information. For example, according to one exemplary embodiment, the tenant information as described above may be supplemented by additional information pertinent as to the risk associated with an individual. Such information may include, but is not limited to, credit reports and/or scores from credit bureaus, criminal history, outstanding leans, court orders, public records, and other information commonly used by tenant screening services.

Exemplary Process

Figure 3:
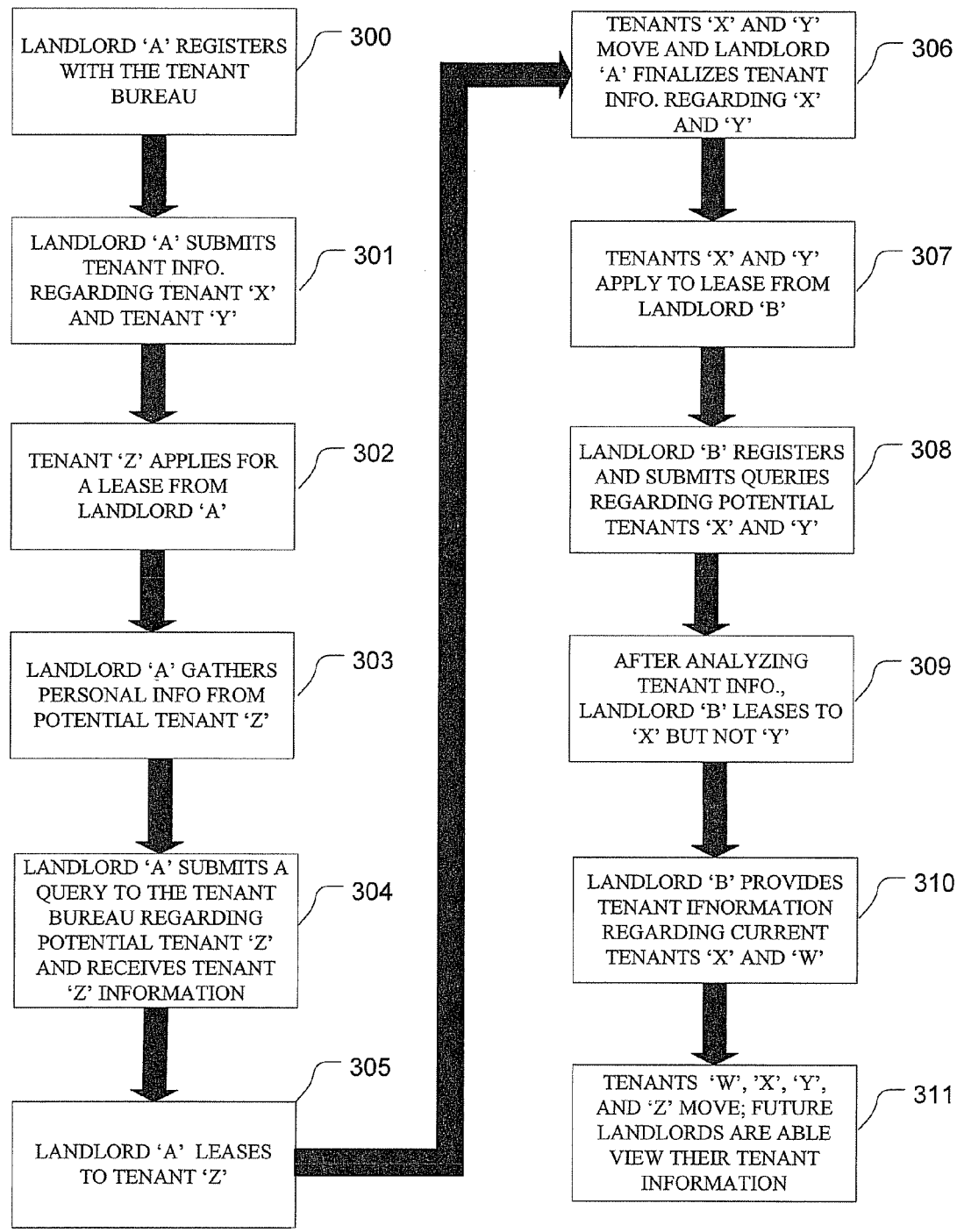
FIG. 3 is a flow chart providing an exemplary application of a consumer information bureau for the purpose of tenant screening, according to one exemplary embodiment.

To further explain the value of the tenant bureau, and to more clearly view an application thereof, an exemplary method of using the tenant bureau is provided in conjunction with FIG. 3, according to one embodiment. It should be understood that the process as delineated in FIG. 3 and described herein is merely exemplary and many of the steps illustrated in FIG. 3 and other processes described herein may be implemented in alternative orders and/or exclude or include additional steps or repetition of any number of the steps.

The process of FIG. 3 is intended to provide an example of the utility of a tenant bureau as well as clarify how it might be implemented according to one exemplary embodiment. Throughout the subsequent description it should be understood that while a landlord is used for illustrative purposes, a landlord is only one type of client that might have access to the tenant bureau.

According to one exemplary embodiment, a plurality of clients utilizing a tenant bureau for both submitting tenant information regarding their current tenants as well as submitting queries regarding the risk of potential tenants may include a recently registered Landlord 'A' (step 300), as shown in FIG. 3. According to the present exemplary method, Landlord 'A' has two current tenants, Tenant 'X' and tenant 'Y'. On a regular basis, Landlord 'A' submits tenant information regarding each of the two tenants, 'X' and 'Y' (step 301). As previously described, the tenant information submitted regarding Tenants 'X' and 'Y' includes, but is not limited to, payment history, complaints about and/or from the tenant, deposits paid by the tenant, deposits returned to the tenant, damage done to the rental unit by the tenant, eviction started, eviction completed, abandonment of the lease or property, smoking status of the unit, smoking status of the tenant, whether pets are allowed, whether pets were occupying the unit, and/or length of time of the tenant occupying the unit. According to one exemplary embodiment, Landlord 'A' submits tenant information (step 301) on a regular basis; however according to and alternative embodiment, the tenant information may be submitted at certain intervals, or only upon termination of the lease agreement between the landlord and the tenant. Submission of tenant information (step 301) may be performed, according to one exemplary embodiment, via a web-based interface generated by the tenant bureau (110; FIG. 1) accessed via the data communication network (150; FIG. 1).

Returning again to FIG. 3, Landlord 'A' receives an application to lease from Tenant 'Z' (step 302), consequently Tenant 'Z' becomes a potential tenant of Landlord 'A'. Landlord 'A', according to one exemplary embodiment, requests personal information from potential Tenant 'Z' (step 303). According to one exemplary embodiment, Landlord 'A', as a registered client of the tenant bureau, is authorized to utilize the client query interface (250, FIG. 2) shown in FIG. 2 to request the tenant information regarding potential Tenant 'Z' (step 304). The tenant information received by Landlord 'A' regarding potential Tenant 'Z', according to several exemplary embodiments, may include any of a number of responses from the tenant bureau including any of the following: that there is no history for the given tenant available, a concise report of Tenant 'Z's tenant history (e.g. graph or number), a document containing all of the tenant information submitted by previous landlords, a summary of the tenant information provided by previous landlords, and/or other methods or combinations of the tenant information available to the tenant bureau.

Once Landlord 'A' receives the tenant information regarding potential Tenant 'Z', Landlord 'A' makes a decision to lease to Tenant 'Z' fully aware of the risk, or lack thereof, of his decision (step 305). As is typical of a lease agreement between a landlord and tenant, the leases to both Tenants 'X' and 'Y' expire and they choose to move out (step 306). According to one exemplary embodiment, Landlord 'A' now finalizes the tenant information regarding both tenants (step 306); that is, tenant information is submitted to the tenant bureau for the last time including any information, including the above-mentioned items, in regards to tenant information. According to one exemplary embodiment, the tenant information is submitted through the client input interface (230, FIG. 2) described in conjunction with FIG. 2 above.

To further illustrate advantages and possibilities of the system and method described herein in reference to a tenant bureau, we will assume that the tenant information submitted by Landlord 'A' regarding Tenant 'X' is overall positive and generally indicates that Tenant 'X' is a low-risk tenant. While the tenant information regarding Tenant 'Y' submitted by Landlord 'A' discloses that Tenant 'Y' was extremely disruptive, caused major damage to the property, and failed to pay the rent on time five times during the last year—a generally high-risk tenant.

As illustrated in FIG. 3, and continuing with the hypothetical example, both Tenant 'X' and Tenant 'Y' learn of an available lease through Landlord 'B', and apply for the lease. A typical screening process performed by Landlord 'B' on both of the potential tenants would reveal nothing in regards to the damage done by Tenant 'Y' nor the failure to pay in a timely manner. However, in an attempt to minimize the risk associated with leasing, Landlord 'B' registers with the tenant bureau. After collecting personal information from both of the potential tenants, 'X' and 'Y', submits a query through, according to one exemplary embodiment, the client query interface (250, FIG. 2) requesting tenant information regarding both of the potential tenants (step 308, FIG. 3). Landlord 'B', receives the tenant information regarding Tenants 'X' and 'Y', and after recognizing the high risk associated with Tenant 'Y' denies the application while extending an offer of lease to Tenant 'X' (step 309). It can therefore be seen that the tenant bureau is able to provide a landlord a much more complete real-time set of facts regarding tenancy records than is currently available in the prior art. This enables participating landlords to better assess the risks associated with a given applicant, and thereby assist them in minimizing risks and maximizing profits.

Expanding more on the hypothetical situation described in conjunction with FIG. 3, Landlord 'B' begins submitting tenant information regarding the new tenant, Tenant 'X', and a previous tenant, Tenant 'W' (step 310) through, according to one exemplary embodiment, the client input interface (230, FIG. 2). With time, it is conceivable and probable that all of tenants of both Landlord 'A' and Landlord 'B' move. When this occurs, both landlords submit and finalize tenant information regarding Tenants 'W', 'X', and 'Z' and any number of other clients that have moved that were prior tenants of 'A' or 'B' (step 311). As these tenants move on and seek lease agreements with other landlords, the future landlords can, through the tenant bureau, obtain the tenant information of any of these tenants and more adequately determine the risk associated with a lease agreement.

It is conceivable that a landlord receives an application to lease from a tenant, and upon submitting personal information regarding the tenant to the tenant bureau finds that the tenant has no history within the tenant bureau database. The landlord may elect to grant a lease to the tenant and subsequently begin submitting tenant information regarding the new tenant. According to one exemplary embodiment, a landlord can create a tenant profile, and thereafter submit tenant information regarding the tenant.

The present exemplary consumer information bureau for the purpose of tenant screening, herein referred to as the tenant bureau, is different from traditional consumer information bureaus in both purpose of the data collection and the primary source of the data collected.

Traditional consumer information bureaus, such as credit bureaus, gather information primarily from banks and other creditors. In contrast, the present exemplary tenant bureau gathers information primarily from clients, including but not limited to, landlords, agents, real estate advisors, tenants, tax preparers, and landlord representatives. Gathering information from clients allows the present exemplary tenant bureau to gather information with an eye toward assisting clients in screening potential tenants.

Consequently it can be seen that a tenant bureau, as described herein, serves to provide landlords and their agents with more complete information for determining the risks associated with a potential tenant than is currently available.

The preceding description has been presented only to illustrate and describe possible embodiments of the present exemplary system and method. It is not intended to be exhaustive or to limit the system and method to any precise form disclosed. Many modifications and variations are possible in light of the above teaching. Modification of the above disclosure may include only pieces of the process or system as exclusive entities or combinations of pieces to form a useful application in which various described elements of the disclosure are not incorporated. It is intended that the scope of the present exemplary system and method be defined by the following claims.

What is claimed is:

1. A tenant information system comprising:
   a processor; and
   a memory, said memory storing instructions executable by said processor and a database of both positive and negative tenant information;
   wherein said memory includes instructions which, when accessed by said processor generates a client interface;
   wherein said client interface is configured to receive and display said positive and negative tenant information from said memory and to provide said positive and negative tenant information to a requesting client; and
   wherein said database is configured to receive tenant information from said client; wherein said system is configured to create a tenant profile, edit said tenant profile, augment current tenant information regarding a tenant, request tenant information from said electronic database regarding a tenant, and generate a tenant risk assessment based on said tenant information, said tenant risk assessment being displayed to said client via said client interface.

2. The tenant information system of claim 1, wherein said tenant information comprises payment history of said tenant, complaints about said tenant, complaints by said tenant, deposits paid and returned to said tenant, damage done to a leased property by said tenant, evictions started and completed against said tenant, abandonment of a lease or property by said tenant, smoking status of a property, smoking status of said tenant, pet permission of a property, duration of occupation of a property by said tenant, credit information of said tenant, criminal history of said tenant, outstanding liens of said tenant, court orders against said tenant, and public records of said tenant.

3. The tenant information system of claim 2, wherein:
   said database comprises an electronic database;
   said electronic database is communicatively connected to at least one server; and
   said tenant information system being accessible by a client via one of a peer-to-peer network, a direct-connect network, or a wireless network.

4. The tenant information system of claim 1, wherein said client interface comprises:
   a client input interface; and
   a client query interface;
   wherein said client input interface is configured to allow said client to create a tenant profile, enter tenant information, and edit tenant information; and
   wherein said client query interface is configured to allow said client to request said tenant information regarding a specific tenant and display said client with said tenant information regarding said specific tenant, said client query interface further being configured to display said tenant risk assessment, said tenant risk assessment being one of a numerical tenant score or an adjective rating between high and low.

5. The tenant information system of claim 4, wherein said client interface comprises a webpage.

6. The tenant information system of claim 1, wherein said tenant information system is configured to receive information about a tenant and generate a tenant screening risk level associated with said tenant based on said tenant information;
   wherein said system is configured to graphically display said tenant screening risk level to a client via a client interface;

said graphical display of said tenant risk level being one of a graph, a meter, or a color coordinated ranking.

7. The tenant information system of claim 1, wherein said client interface comprises:
an input interface; and
a query interface;
wherein said input interface is configured to receive both positive and negative tenant information from said client; and
said query interface is configured to deliver tenant information in the form of a tenant screening risk level to said client;
wherein said query interface portion of said input interface is configured to graphically display said tenant screening risk level to a client in the form of an alphanumeric ranking.

8. A computer-implemented method of screening tenants comprising:
receiving, at a central server, both positive and negative tenant information from at least one client;
creating a database communicatively coupled to said central server, said database
being configured to store said tenant information for tenant screening;
generating a user interface at a computer associated with said at least one client configured to allow said at least one client access to said database;
generating a tenant risk assessment at said central server, said tenant risk assessment being based on said tenant information, said tenant risk assessment being displayed to said client via said user interface; and
wherein said online interface is configured to enable said at least one client to create a tenant profile, submit tenant information regarding a tenant to said database, and request tenant information regarding a tenant from said database by accessing said central server; wherein said online interface is generated at said computer associated with said at least one client and is configured to access said electronic database via said central server to store said tenant profile and said tenant information.

9. The computer-implemented method of screening tenants of claim 8, wherein said at least one client comprises landlords.

10. The computer-implemented method of screening tenants of claim 8, wherein said tenant information comprises payment history of said tenant, complaints about said tenant, complaints by said tenant, deposits paid and returned to said tenant, damage done to a leased property by said tenant, evictions started and completed against said tenant, abandonment of a lease or property by said tenant, smoking status of a property, smoking status of said tenant, pet permission of a property, duration of occupation of a property by said tenant, credit information of said tenant, criminal history of said tenant, outstanding liens of said tenant, court orders against said tenant, and public records of said tenant.

11. The computer-implemented method of screening tenants of claim 8, wherein said database communicatively coupled to said central server, comprises an electronic database;
wherein said electronic database is accessible to clients via an online interface;
said online interface configured to both accept said tenant information from said at least one client and to provide tenant information regarding a specific tenant at said at least one client's request.

12. The computer-implemented method of screening tenants of claim 8, wherein said online interface generated at said computer associated with said at least one client is configured to restrict access to said tenant information to registered clients.

13. A tenant information system comprising:
a processor; and
a memory, said memory storing instructions executable by said processor and a database of both positive and negative tenant information;
wherein said memory includes instructions which, when accessed by said processor generates a client interface in the form of a webpage;
wherein said client interface is configured to receive and display said tenant information from said memory and to provide said tenant information to a requesting client wherein said database comprises an electronic database, said electronic database is communicatively connected to at least one server, and said tenant information system being accessible by a client via one of a peer-to-peer network, a direct-connect network, or a wireless network;
wherein said tenant information system is configured to assess said tenant information and allocate a tenant screening risk level to said tenant, said tenant risk assessment being graphically displayed to said client via said client interface;
said graphical display of said tenant risk assessment being one of a graph, a meter, or a color coordinated ranking; and
wherein said database is configured to receive tenant information from said client;
wherein said system is configured to create a tenant profile, edit said tenant profile, augment current tenant information regarding a tenant, and request tenant information from said electronic database regarding a tenant.

14. The tenant information system of claim 13, wherein said tenant information comprises payment history of said tenant, complaints about said tenant, complaints by said tenant, deposits paid and returned to said tenant, damage done to a leased property by said tenant, evictions started and completed against said tenant, abandonment of a lease or property by said tenant, smoking status of a property, smoking status of said tenant, pet permission of a property, duration of occupation of a property by said tenant, credit information of said tenant, criminal history of said tenant, outstanding liens of said tenant, court orders against said tenant, and public records of said tenant.

15. The tenant information system of claim 13, wherein said client interface comprises:
a client input interface; and
a client query interface;
wherein said client input interface is configured to allow said client to create a tenant profile, enter tenant information, and edit tenant information; and
wherein said client query interface is configured to allow said client to request said tenant information regarding a specific tenant and display said client with said tenant information regarding said specific tenant.

16. The tenant information system of claim 13, wherein said client interface comprises:
an input interface; and
a query interface;
wherein said input interface is configured to receive tenant information from said client; and
said query interface is configured to graphically deliver tenant information to said client.

* * * * *